United States Patent [19]
Bartholomew et al.

[11] Patent Number: 5,639,048
[45] Date of Patent: Jun. 17, 1997

[54] CABLE TRAY SYSTEM

[75] Inventors: Paul J. Bartholomew, Memphis; Roger L. Vaught, Cordova, both of Tenn.; Michael Jurgenliemk, King City, Canada

[73] Assignee: Thomas & Betts Corporation, Memphis, Tenn.

[21] Appl. No.: 375,018

[22] Filed: Jan. 19, 1995

[51] Int. Cl.[6] .................................................. F16L 3/00
[52] U.S. Cl. ................................................ 248/49; 248/68.1
[58] Field of Search .................... 248/49, 68.1; 174/68.1

[56] References Cited

U.S. PATENT DOCUMENTS

| | | | |
|---|---|---|---|
| D. 293,203 | 12/1987 | Hertensteiner | D8/354 |
| 2,375,513 | 5/1945 | Bach | 248/59 |
| 3,022,972 | 2/1962 | Burnston | 248/68.1 |
| 3,035,800 | 5/1962 | McLeod | 248/68.1 |
| 3,042,351 | 7/1962 | DuBois | 248/49 |
| 3,137,468 | 6/1964 | Meinders | 248/49 |
| 3,292,886 | 12/1966 | Rovinsky | 248/49 |
| 3,521,843 | 7/1970 | Ogle | 248/58 |
| 3,598,349 | 8/1971 | Drake | 248/68.1 X |
| 3,618,882 | 11/1971 | Podedworny | 248/68.1 |
| 3,680,817 | 8/1972 | Gogan | 248/68.1 |
| 3,787,016 | 1/1974 | Laval, Jr. | 248/49 |
| 3,791,613 | 2/1974 | Nollen | 248/49 |
| 3,944,176 | 3/1976 | Danko | 248/68.1 |
| 4,232,845 | 11/1980 | Turner | 248/49 |
| 4,432,519 | 2/1984 | Wright | 248/49 |
| 4,960,253 | 10/1990 | Perrault et al. | 248/68.1 |
| 5,169,099 | 12/1992 | Yang | 248/49 |

FOREIGN PATENT DOCUMENTS

| | | | |
|---|---|---|---|
| 2911100 | 9/1980 | Germany | 248/49 |
| 0437458 | 6/1967 | Switzerland . | |

OTHER PUBLICATIONS

B–Line Systems Catalog, "Cable Tray Systems", CT3, Cover page, Introduction and pp. 37, 68, 68, dated 1990.
NEMA Standards "Definitions", VE Jan. 1991, p. 3.

Primary Examiner—Ramon O. Ramirez
Attorney, Agent, or Firm—Michael L. Hoelter; Salvatore J. Abbruzzese

[57] ABSTRACT

A cable tray support system supports a plurality of cables and conduits therein. Cable tray support system includes a pair of longitudinally extending transversely spaced rails and a plurality of longitudinally spaced transversely extending cable support members extending between the rails. Cable support members include provisions for the secure support of cables within the tray by use of both a cable tie and a pipe strap. Such combination provides greater flexibility to the cable tray of the present invention by allowing several securement techniques within a given cable tray system.

32 Claims, 7 Drawing Sheets

CABLE TRAY SYSTEM

FIELD OF INVENTION

The present invention relates generally to an apparatus for supporting extended runs of electrical cables or other conduits. More particularly, the present invention relates to a cable tray support system which is designed to support a plurality of cables or conduits above ground.

BACKGROUND OF THE INVENTION

In the construction of various types of buildings, factories, and other commercial structures, extensive networks of cables and conduits are needed for a variety of purposes. Such purposes may include the provision of electrical power, the transmission of communication and data signals, and the transportation of fluids such as gases or liquids. Such transmission is achieved via the use of electrical cables and other conduits which are routed throughout the structure. It can be appreciated that due to the size, number and complexity of cables and conduits which are used in many modern commercial structures, the efficient routing of such cables and conduit may be rendered difficult.

In order to effectively manage the routing of such cables and conduits, the art has seen the use of cable tray systems. As defined by the National Electrical Code, a cable tray system is an assembly of units or sections and associated fittings forming a rigid structural system used to support cables.

Cable tray systems may take a variety of shapes and forms but common to all such systems are a pair of spaced apart elongate side walls or rails between which the cables or conduits are supported. The cables or conduits may be secured to solid bottom trays (troughs) or spaced apart rungs which span the side rails and provide a surface on which the cables or conduits may be mounted. The cable tray may be supported at various levels above ground by use of overhead supports, floor-mounted supports or by extending the tray along the wall of a structure. The cable trays are permitted to extend transversely through partitions in walls to permit routing of cables and conduits to various locations within the structure. Examples of various types of cable trays are shown and described in the following patents: U.S. Pat. Nos. 3,022,972; 3,035,800; 3,042,351; 3,521,843; 3,618,882; 3,680,817; 3,791,613; 4,232,845; and 4,432,519.

In order to effectively route cables and conduits with a cable tray, the cables and conduits may be securely fastened within the cable tray. Such securement is desired to hold the cables or conduits in place and to prevent lateral shifting. This is typically accomplished by securing the cables or conduits to the trough or rungs extending between the spaced apart side rails. Cable tray systems include various accessory-hardware used to secure the cables and conduits to the trough or rungs supported between the side rails. As may be appreciated, with the wide variety of shapes, sizes and purposes for various cables and conduits, there is a need for various types of cable support accessory-hardware to secure the cables and conduits in the cable tray. In order to assure that all types of cable and conduit may be secured in a particular cable tray, the trough or rungs positioned between the side rails should include provisions for the accommodation of the various types of cable supports.

Support hardware such as pipe clamps, straps, clamps, cable ties and the like are all employed in certain situations to support a particular type of cable or conduit. However, many of the support trays of the prior art do not include the provision for the easy accommodation of different types of cable support hardware. This necessitates the installer, who is employing a cable or conduit not readily accommodated by the particular cable tray support hardware, to improvise when supporting such particular cable or conduit. In these situations, the cable or conduit may not be securely supported to the cable tray or may be supported in such a position that, over time, damage to the cable or conduit may take place.

In addition, with respect to a ladder-type cable tray or a ventilated type cable tray where spaces exist between the cable support surfaces of the cable tray, less surface area is available to securely support the cable between adjacent solid portions of the tray. It has been found that, especially with the ladder type cable trays of the prior art, there is insufficient surface area to suitably support a multiplicity of conduits and cable, especially where differing types of support hardware must be used within a single cable tray system.

SUMMARY OF THE INVENTION

It is therefore an object of the present invention to provide a cable support tray which permits the support of electrical cables employing differing types of cable support hardware within a single cable tray.

It is a further object of the present invention to provide a cable support tray which provides a cable support surface which accommodates cable securement hardware of differing types.

It is still a further object of the present invention to provide a ladder or rung type cable support tray which provides an increase in the cable support surface area defined between the rails of the support tray.

In the efficient attainment of these and other objects the present invention provides a cable support tray for supporting electrical cables, conduits, or the like. The support tray includes a pair of longitudinally extending transversely spaced rails and a plurality of longitudinally spaced transversely extending cable support members extending between the rails. Each cable support member includes a first planar surface having a plurality of transversely spaced first apertures therethrough. Each first aperture has a longitudinal extent in the direction of the rail. The apertures are sized to accommodate and positionally confine a transverse extent of a cable tie therethrough. The planar surface defining the first cable support surface between the adjacent first apertures directly supports an extent of the cable thereagainst and is directly securable thereto by the passage of a cable tie through adjacent first apertures and around the cable extent. Additionally, each cable support member may include a pipe strap accommodating member which supports a pipe strap and defines thereadjacent a second cable support surface which is spaced from the first cable support surface. The second cable support surface supports a longitudinal extent of one of the cables.

As particularly shown by way of the preferred embodiments herein, the present invention may be employed with a ventilated trough where each cable support member supports both the first planar surface and the second planar surface so that the cable may be supported by either a cable tie or a pipe strap.

In a further embodiment, in a ladder type cable tray, the cable support member may include the rungs of the ladder where first cable support surface is positioned in opposed facing relationship to the second cable support surface. In this manner, one cable may be supported to one surface of the rung with a cable tie and another cable to the opposed surface of the rung with a pipe strap.

A still further embodiment of the present invention provides for a ladder type cable tray where both the pipe strap accommodating member and the cable tie support cables in the same plane.

DETAILED DESCRIPTION OF THE PREFERRED EMBODIMENTS

The present invention provides an improved cable tray for supporting cables and conduits. The present invention contemplates supporting various types of cables and conduits such as electrical cables, communications cables, various types of fluid conduits, pipes and the like. Notwithstanding such uses, the device of the present invention is commonly referred to as a "cable" tray even though conduits other than cables are also supported thereby. Accordingly, as used hereinthroughout, for simplicity the term "cable" will also denote all types of cables and conduits which may be supported in the cable tray in a manner set forth by the present invention.

Figure 1:
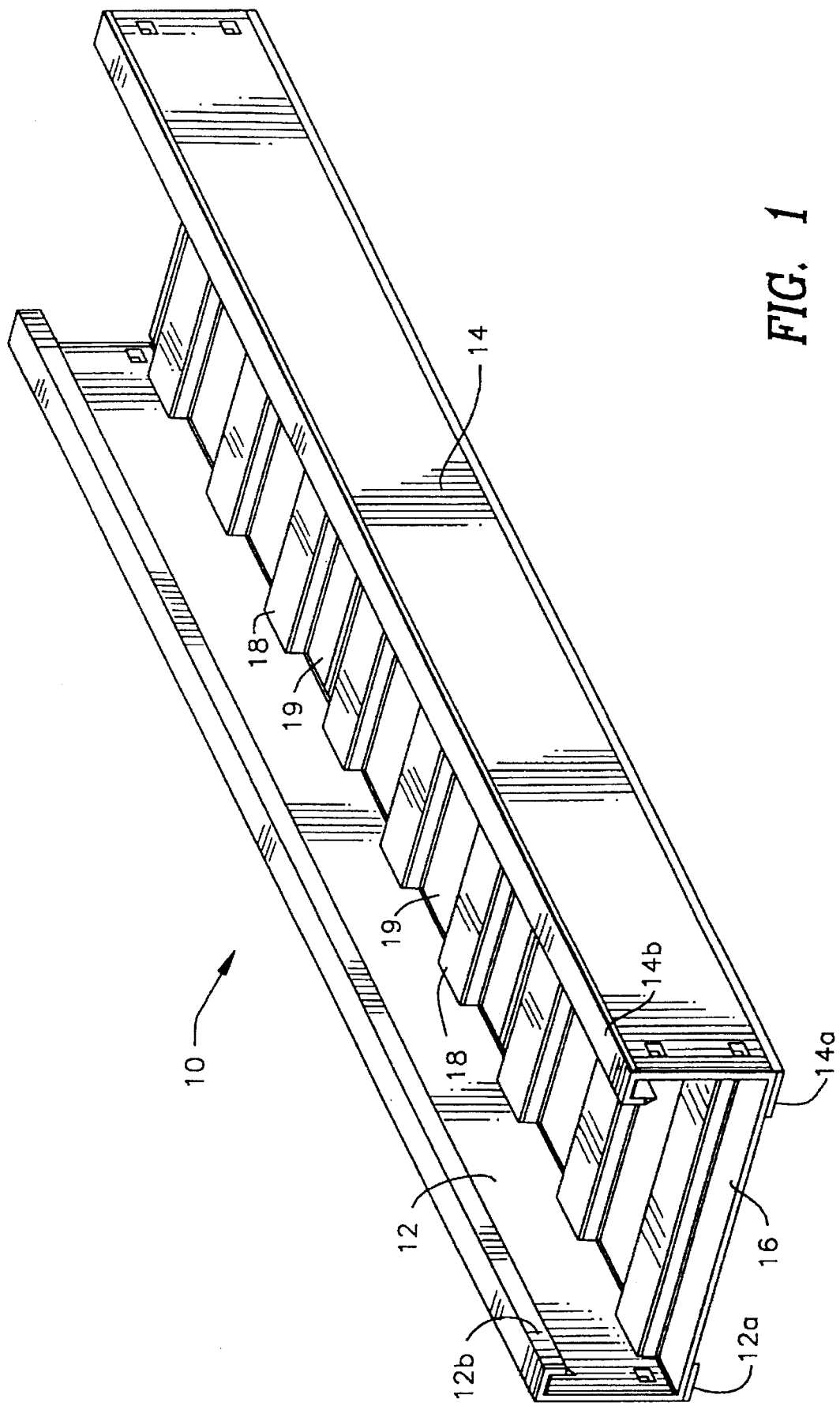
FIG. 1 is a perspective showing of a solid trough type cable tray of the present invention.
Figure 2:
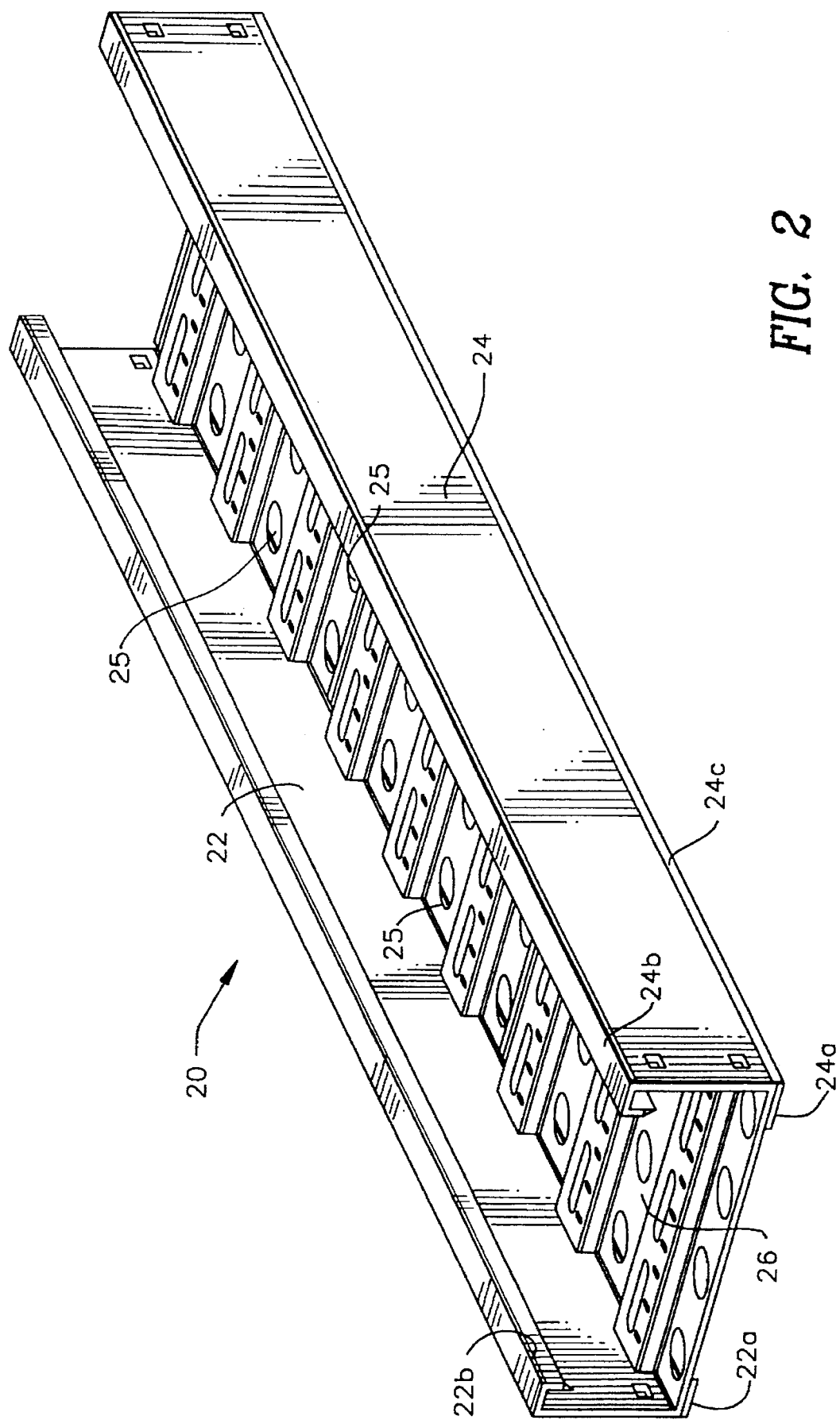
FIG. 2 is a perspective showing of a ventilated trough type cable tray of the present invention.
Figure 5:
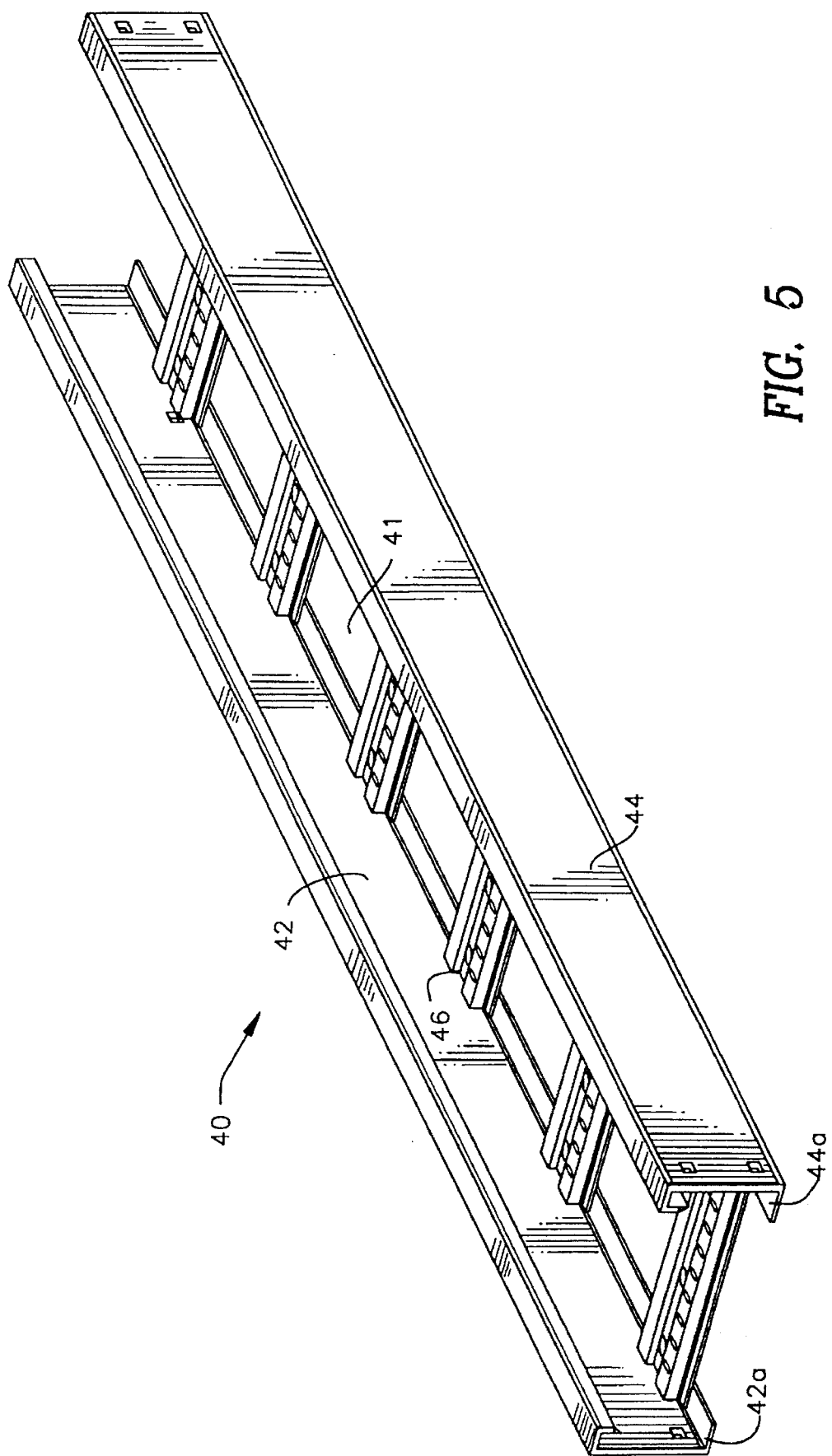
FIG. 5 is a perspective showing of a ladder type cable tray of the present invention.
Figure 8:
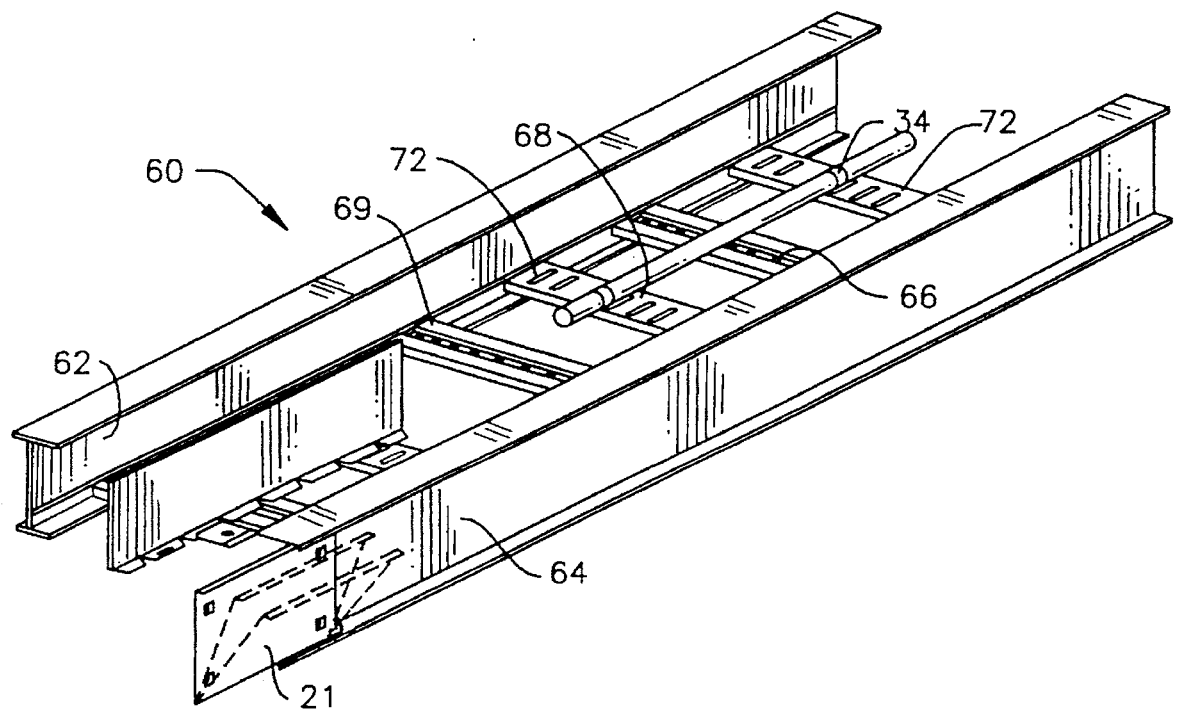
FIG. 8 is a perspective showing of a further ladder type cable tray of the present invention.

It is also within the contemplation of the present invention to form the cable trays in various construction types, such as trough type cable trays shown in FIGS. 1 and 2 as well as ladder type cable trays shown in FIGS. 5 and 8. Also, the cable trays of the present invention may be formed of a wide variety of materials well known in the cable tray art. Common materials useful in forming cable trays are, for example, aluminum, steel and stainless steel.

Referring specifically now to FIG. 1, a solid trough type cable tray 10 of the present invention is shown. As is common of cable tray construction, the trough type cable tray 10 of the present invention includes a pair of elongate transversely spaced longitudinally extending support rails 12 and 14. Rails 12 and 14 are elongate generally planar members having inwardly directed bottom edges 12a and 14a respectively, as well as inwardly curled upper extents 12b and 14b. Extending between spaced apart rails 12 and 14 is a solid corrugated base 16 which forms with rails 12 and 14 a generally U-shaped trough. Base 16 is supported on inwardly directed edges 12a and 14a. Securement hardware (not shown) may be used to secure base 16 to rails 12 and 14. In forming rails 12 and 14 the lower ends thereof, outwardly adjacent inward edges 12a and 14a, include an outwardly protruding edge bead 12c and 14c. This construction strengthens the bottom of rails 12 and 14 and allows the rails to support solid base 16 therebetween. This eliminates the need, in many prior art solid trough type cable trays, to manufacture rails 12 and 14 in I-beam construction. The construction of the present invention enables the rails to support base 16 with less material and also permits installation of the cable tray 10 with one of the rails 12 or 14 directly against a vertical wall.

Base 16 includes in corrugated fashion, a plurality of spaced apart transversely extending raised cable support surfaces 18. Between each raised cable support surface 18, base 16 forms a recessed lower surface 19. Lower surfaces 19 lie in a plane which is vertically spaced from the plane in which cable support surfaces 18 lie. Thus, cable support surfaces 18 provide a raised surface which directly supports a longitudinal extent of cable 30, FIG. 3 which may be positioned between rails 12 and 14.

While in the embodiment shown in FIG. 1, one section of cable tray 10 is shown it can be appreciated that extended runs of cable tray 10 may be formed by attaching successive cable tray segments together in longitudinal fashion. Appropriate joining hardware 21 such as the type shown in FIGS. 3 and 8 may be employed to join cable tray segments.

Referring now to FIG. 2, a further embodiment of the trough type cable tray of the present invention is shown. Trough type cable tray 20 of FIG. 2 is a ventilated cable tray substantially similar to that shown and described with respect to FIG. 1. Cable tray 20 includes a pair of transversely spaced longitudinally extending side rails 22 and 24 having inwardly directed lower edges 22a and 24a as well as inwardly turned upper extents 22b and 24b. Supported between rails 22 and 24 on edges 22a and 24a is a longitudinal corrugated substantially solid base 26. Corrugated base 26 includes a plurality of transversely spaced raised cable support surfaces 28 and alternating recessed lower surfaces 29. The shape of the corrugated base 26 of FIG. 2 is substantially similar to that of corrugated base 16 of FIG. 1.

Figure 3:
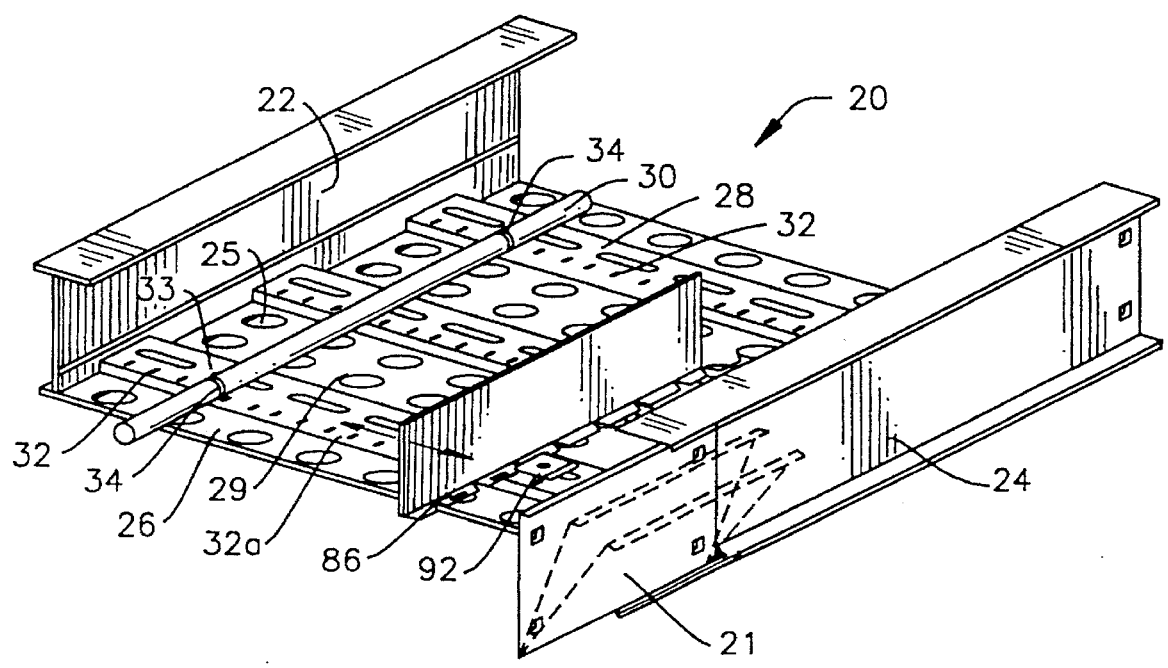
FIG. 3 is an enlarged perspective showing of a portion of the cable tray of FIG. 2.

Shown additionally in FIG. 3, recessed lower surfaces 29 of corrugated base 26 includes a plurality of ventilation openings 25 extending therethrough. Ventilation openings 25 are generally shown as circular openings extending in transverse pairs between spaced apart rails 22 and 24. Openings 25 are provided to allow air flow through corrugated base 26. In accordance with National Electrical Code practices, the provision of ventilation openings 25 allowing such air flow permits the particular trough type cable tray 20 shown in FIG. 2 to accommodate an increase in the number and size of cables and conduits which are permitted to be supported therein.

As particularly shown in FIG. 3, the raised cable support surfaces 28 of base 26 include a plurality of first apertures 32 spaced transversely thereacross. Apertures 32 are generally elongate apertures having a longitudinal extent generally extending in the direction of rails 22 and 24 and a smaller transverse extent. First apertures 32 are sized to insertably support therethrough a conventional cable tie 34. Cable tie 34 may be a standard plastic or metal cable tie, an example of which is the cable tie sold by the assignee herein under the trademark TY-RAP®. Each pair of adjacent first apertures 32 defines a portion 32a of raised cable support surface 28 which directly supports a transverse extent of cable 30. In this manner cable 30 is positioned between two adjacent first apertures 32 and cable tie 34 may be looped therearound and inserted through the adjacent apertures.

Cable tie 34 is secured in a conventional fashion, either beneath raised cable support surface 28 or over cable 30, and is tightened so as to secure the transverse extent of cable 30 against portion 32a of raised cable support surface 28. As may be appreciated, cable 30 is supported directly against portion 32a which forms a securement surface through which the cable tie 34 is inserted. This permits the cable 30 to be secured directly to the surface on which it is supported. Further, as first apertures 32 lie on either side of support portion 32a which supports the transverse extent of cable 30, cable tie 34 may be looped about cable 30 in substantially perpendicular orientation as shown in FIG. 3. Many prior art devices not including such apertures, especially ladder-type cable trays having spaced rungs, require the cable tie to be wound around the cable in a diagonal or canted fashion. Such securement does not securely support cable 30 squarely in the cable tray.

As shown in FIG. 3, a length of cable 30 may be secured to successive raised cable support surfaces 28 with additional cable ties 34 to secure cable 30 within trough 20. The number of securement locations is typically selected by the size of cable to be supported.

Raised cable support surfaces 28 of cable tray 20 further include a plurality of second apertures 36. Second apertures 36 are longitudinal apertures having a longitudinal extent extending transversely to rails 22 and 24. Second apertures 36 are transversely spaced across raised cable support surface 28 and are longitudinally adjacent first apertures 32. Second apertures 36 permit the accommodation therein of a pipe strap 38 shown more particularly in FIG. 4.

Pipe strap 38 is a conventionally available cable tray accessory which is commonly used in connection with cable trays to support a pipe, conduit or cable. Conventional pipe strap 38 includes a pair of side-by-side identically formed pipe strap members 38a for position on opposite sides of cable 30. Pipe strap members 38a are joined at the upper end by a bolt or other fastener 39 to secure the cable therebetween. The lower ends of pipe strap 38 are formed to have a pair of marginal recesses 37 adjacent the lower ends thereof. Recesses 37 permit the accommodation of pipe strap 38 within second apertures 36.

Figure 4:
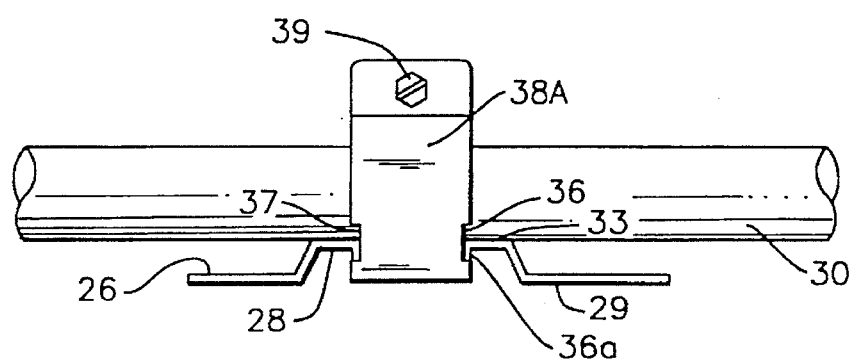
FIG. 4 is a sectional showing of a portion of the cable tray of FIG. 3 showing a cable mounted thereto.

As particularly shown in FIG. 4, raised cable support surface 28 includes a depending lip 36a which extends downwardly adjacent each longitudinal side of second aperture 36. Lip 36a resides within recesses 37 to securely hold pipe strap members 38a therein. To secure cable 30 using pipe strap 38, pipe strap members 38a are inserted into second apertures 36 so that lips 36a are resident within recesses 37. The pipe strap members 38a are then secured over cable 30 by fastener 39 which is tightened pulling up the pipe strap members against each lip 36a securely holding cable 30 against a portion 33 of raised cable support surface 28. This portion 33 of cable support surface 28 is coplanar with and spaced longitudinally adjacent portions 32a defined between first apertures 32. As described above with respect to first apertures 32, second apertures 36 permit cable 30 to be supported with a pipe strap directly against raised cable support surface 28.

Figure 6:
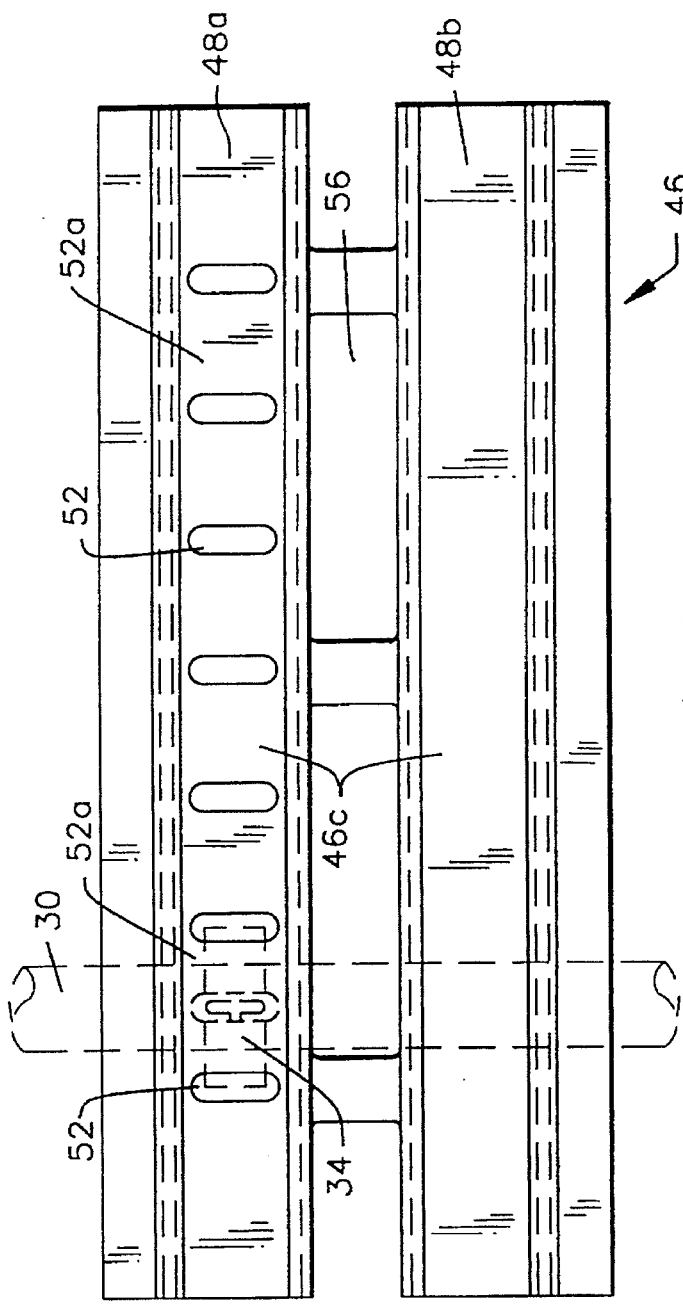
FIGS. 6 and 7 are respectively a top plan view and a cross sectional showing of one of the rungs of the ladder type cable tray of FIG. 5 with cables shown in phantom.
Figure 7:
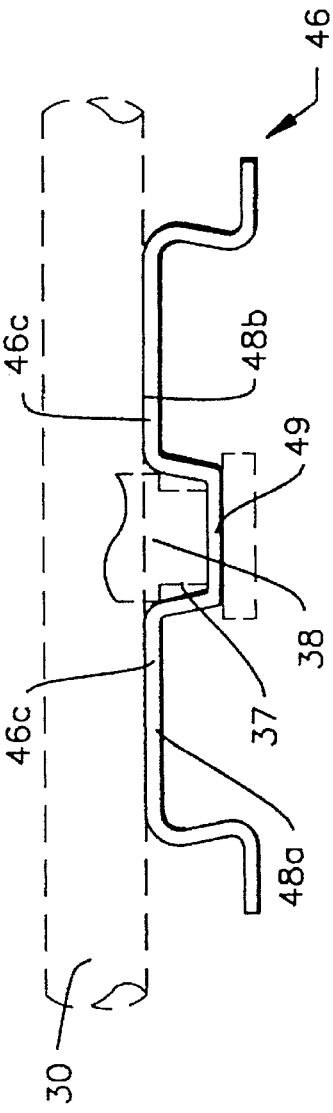

Referring now to FIGS. 5, 6 and 7, a further embodiment of the cable tray of the present invention is shown. FIG. 5 shows a ladder type cable tray 40 including a pair of longitudinally extending transversely spaced side rails 42 and 44 of construction similar to side rails described above in the previous embodiments. The inwardly directed edges 42a and 44a of rails 42 and 44 support therebetween a plurality of discrete longitudinally spaced transversely extending support rungs 46, one of which is shown in FIGS. 6 and 7. Rung 46 includes a pair of raised cable support surfaces 48a and 48b which are longitudinally spaced. Between space raised cable support surfaces 48a and 48b, rung 46 includes a recessed lower portion 49.

Raised cable support surface 48a includes a plurality of transversely extending first apertures 52 extending thereacross. Apertures 52 are of similar construction to apertures 32 shown in FIGS. 2 and 3 and are constructed to accommodate in similar fashion, cable tie 34. Similarly, first apertures 52 define therebetween a cable support portion 52a which supports a transverse extent of cable 30 in a manner described above.

Rungs 46 further provide for the accommodation of pipe strap 38 to secure a cable 30 to rung 46. Rung 46 includes at least a pair of transversely spaced elongate second apertures 56 extending through recessed lower portion 49 thereof. Second apertures 56 accommodate pipe strap 38 in a manner similar to that described above. Rung 46 includes a pair of side walls 56a and 56b on either longitudinal side of second aperture 56 between raised cable support surfaces 48a and. 48b. Side walls 56a and 56b serve a function similar to that of lips 36a by being accommodated within recesses 37 of pipe strap 38. The securement of cable 30 to rung 46 by pipe strap 38 provides direct securement of cable 30 to a pair of surface portions 48c on either side of second aperture 56. Support portions 46c are disposed next adjacent pipe strap 38 and are longitudinally spaced apart a distance spanning second aperture 56. Thus, the unsupported extent of cable 30 between portions 46c is minimized. Portions 46c supporting one cable 30 with pipe strap 38 are coplanar with portions 52a which support another cable 30 with cable ties 34.

As shown in FIG. 5, rungs 46 are spaced apart between rails 42 and 44 defining ventilation spaces 41 therebetween. A length of cable 30 may be secured to successive rungs 46 across spaces 41 to properly secure cable 30 to ladder cable tray 40.

Referring to FIG. 8, a still further embodiment of the present invention is shown. FIG. 8 shows a further ladder type cable tray 60 again having a pair of longitudinally extending transversely spaced rails 62 and 64 which support therebetween discrete transversely extending, spaced apart rungs 66. Each rung 66 is generally a rectangular member having a first surface 68 which includes therethrough a plurality of transversely spaced first apertures 72. Again, apertures 72 are of shape and construction similar to that of the first apertures described above with respect to the previous embodiments and permit the accommodation of cable tie 34 therethrough in a manner which firmly and squarely secures cable 30 to first surface 68. Rung 66 further includes an opposed second surface 69 which is parallel to and spaced vertically from first surface 68.

Figure 9:
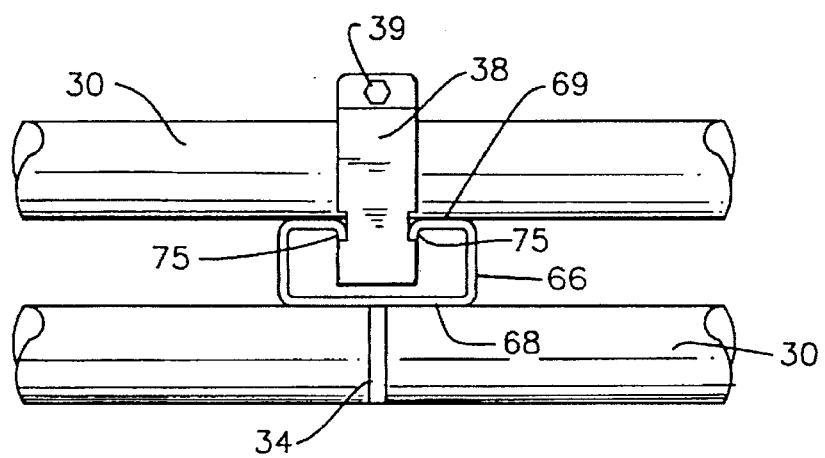
FIG. 9 shows in cross section, a rung of the ladder type cable tray of FIG. 8 with cables supported thereto.

As shown in FIG. 9, rung 66 has generally a U-shaped configuration having a longitudinal central channel through second surface 69. Channel 70 permits the accommodation of pipe strap 38 in a manner shown in FIG. 9. Adjacent each longitudinal side of channel 70, second surface 69 includes downwardly extending spaced apart lips 75 which serve to accommodate pipe strap 38 in a manner similar to that described above. In the present illustrative embodiment, pipe strap 38 secures one cable 30 directly to second surface 69 of rung 66 while cable tie 34 secures another cable 30 to first surface 68 through first apertures 72. Each rung 66 of the present embodiment defines a pair of vertically spaced cable support surfaces which employ different types of cable support hardware.

It is further contemplated that the rungs 66 of the present embodiment may be spaced between rails 62 and 64 in alternating reverse positions. That is, one rung may be positioned with first surface positioned upwardly away from edges 62a and 64a while the next adjacent rung may be positioned with first surface lying directly against edges 62a and 64a. This alternating pattern may be continued along rails 62 and 64. Positioning the rungs 66 in this manner allows the use of either type of cable support for supporting cables on either or both spaced cable support surfaces 68 and 69. This increases the use and flexibility of the ladder type cable tray of the present invention.

The cable tray shown in the various embodiments of the present invention further permits the accommodation of a longitudinally extending barrier 80 such as shown in FIGS. 3 and 8. Barrier 80 is a planar longitudinal member which may be extended between the side rails of the cable tray to transversely separate various groups of cables. It is desirable to provide for the support of barrier 80 at various transverse positions between the rails so as to properly group cables as may be required.

Figure 10:
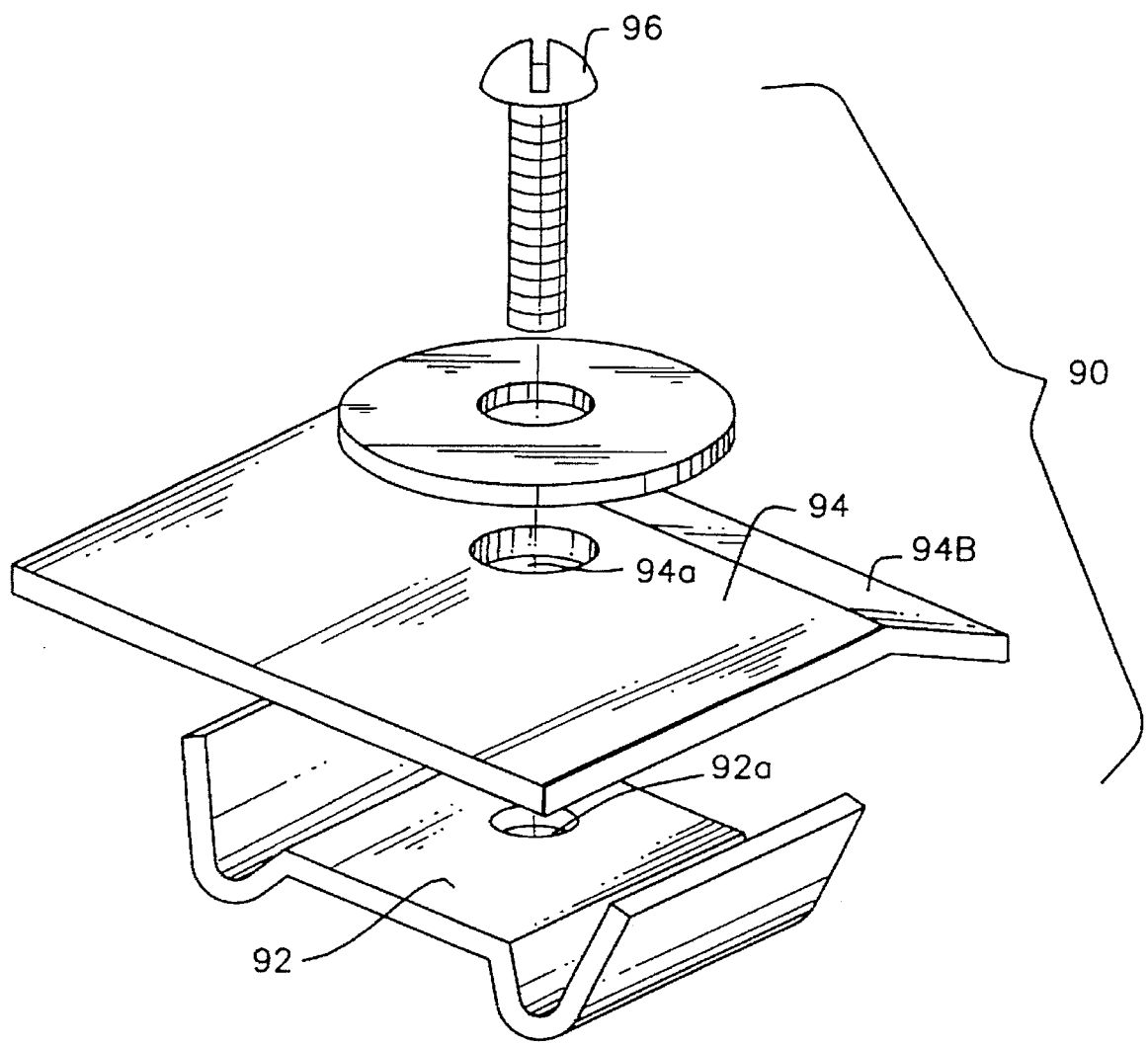
FIG. 10 is an exploded perspective view of accessory-hardware used to support a barrier of the type shown in FIGS. 3 and 8 to the cable tray.

Referring for example to FIG. 3, barrier 80 is shown positioned across and supported to raised cable support surface 28. Barrier 80 includes a lower transverse ledge 84 extending from one longitudinal edge thereof which includes ledge apertures 86 therethrough. Ledge apertures 86 are alignable with first apertures 32 of raised cable support surface 28 so that a conventional bolt may be inserted through the aligned apertures to secure barrier 80 thereto. However the present invention further provides additional support hardware more particularly shown in FIG. 10, which allows barrier 80 to be secured without need for threading a fastener through the aligned apertures. Support hardware 90 includes a lower nut member 92 which is positioned on the under surface of raised cable support surface 28 adjacent second aperture 36. A wedging plate 94 is positioned over raised cable support surface 28 so that an edge of plate 94 extends over ledge 86. A threaded bolt 96 is inserted through an opening 94a in plate 94 and into a threaded opening 92a of nut member 92 to compress plate 94 against ledge 86 holding ledge 86 against raised cable support surface 28. Continued screw tightening of bolt 96 to nut member 92 securely clamps barrier 80 to raised cable support surface 28. In that regard, plate 94 may include a downwardly beveled edge 94b which provides a slight spring bias to place additional compression on ledge 86 upon tightening to securely hold the ledge 86 against raised cable support surface 28. Securement in this manner permits flexibility in that the barrier 80 can be easily moved if such movement is necessary.

A further feature of the present invention, shown particularly in FIGS. 5 and 8, is that the cable tray systems shown therein provide increased cable support surface area per unit length. With reference to FIG. 8, rungs 66, especially with respect to surface 68, provide support for cable 30 entirely across the rung. The rungs 66 of the present embodiment are formed to be wider than rungs currently available in conventional cable trays. As cable 30 is supported directly against surface 68, by use of the first apertures therethrough, an increase in the supported surface area is achieved. The present embodiment contemplates use of rungs 66 having a cable support surface 68 which is approximately 1 9/16" wide. As the entire width supports cable 30, a significant increase in support surface area is achieved. Conventionally, rungs 66 are spaced 12" along rails 62 and 64. Prior art rungs provide at most a 1 1/16" wide support surface. The present invention provides total surface coverage of in excess of 14% over the length of the cable tray, whereas the prior art coverage is less than 10%.

Various changes to the foregoing described and shown structures would now be evident to those skilled in the art. Accordingly, the particularly disclosed scope of the invention is set forth in the following claims.

What is claimed is:

1. A cable support tray for supporting cable comprising:

a pair of longitudinally extending transversely spaced rails; and a plurality of longitudinally spaced, transversely extending cable support members extending between said spaced rails;

each said cable support member including a planar surface having a plurality of transversely spaced first apertures therethrough, each said first apertures having a longitudinal extent in the direction of said rails, said apertures being sized to accommodate and positionally confine a transverse extent of a cable tie therethrough;

said planar surface defining a first cable support surface adjacent said first apertures for direct support of an extent of one of cables thereacross said cable extent being directly securable against said first cable support surface by said passage of said cable tie through said adjacent first apertures and around said cable extent;

each said cable support member further including a second aperture for supporting a pipe. strap and defining adjacent thereto a second cable support surface coplanar with and longitudinally spaced from said first cable support surface for supporting an extent of one of said cables thereacross;

said cable support member further including a third surface positioned between said first and second cable support surfaces, said third surface being non-coplanar therewith.

2. A cable support tray of claim 1 wherein said second aperture extends through said third surface.

3. A cable support tray of claim 1 further including an elongate cable barrier extending across said cable support members between said rails.

4. A cable support tray of claim 3 wherein said pipe strap supporting means further secures said cable barrier to said cable support members.

5. A cable support tray for supporting cable comprising:

a pair of longitudinally extending transversely spaced rails; and a plurality of longitudinally spaced, transversely extending cable support members extending between said spaced rails;

each said cable support member including a planar surface having a plurality of transversely spaced first apertures threrethrough, each said first apertures having a longitudinal extent in the direction of said rails, said apertures being sized to accommodate and positionally confine a transverse extent of a cable tie therethrough;

said planar surface a first cable support surface adjacent said first apertures for direct support of an extent of one of cables thereacross said cable extent being directly securable against said first cable support surface by said passage of said cable tie through said adjacent first apertures and around said cable extent;

each cable support member further including a second aperture for supporting a pipe strap and defining adjacent thereto a second cable support surface coplanar with and longitudinally spaced from said first cable support surface for supporting an extent of one of said cables thereacross;

said cable support member second aperture including a vertically extending lip at least partially bounding said second aperture, said extending lip being engageable with said pipe strap for supporting said pipe strap within said aperture.

6. A cable support tray of claim 5 wherein said second aperture extends through said second cable support surface and wherein said second support surface is defined adjacent said extending lip.

7. A cable support tray for supporting cable comprising:
a pair of longitudinally extending transversely spaced rails; and
a plurality of longitudinally spaced, transversely extending cable support members extending between said spaced rails;
each said cable support member including a planar surface having a plurality of transversely spaced first apertures therethrough, each said first apertures having a longitudinal extent in the direction of said rails, said apertures being sized to accommodate and positionally confine a transverse extent of a cable tie therethrough;
said planar surface defining a first cable support surface adjacent said first apertures for direct support of an extent of one of cables thereacross said cable extent being directly securable against said first cable support surface by said passage of said cable tie through said adjacent first apertures and around said cable extent;
each said cable support member further including pipe strap supporting means for supporting a pipe strap and defining adjacent thereto a second cable support surface for supporting an extent of one of said cable thereacross; said first and second cable support surface being non-coplanar.

8. A cable support tray of claim 7 wherein said first and second cable support surfaces are vertically spaced and oppositely facing for supporting at least a pair of said cables in vertically spaced relation.

9. A cable support tray of claim 8 wherein said cable support member includes a generally U-shaped cross section having a first wall defining said first cable support surface and a pair of elongate spaced side walls extending from said first wall.

10. A cable support tray of claim 9 wherein said pipe strap supporting means includes each distal extent of said side walls including inwardly directed spaced apart extents defining said second cable support surface.

11. A cable support tray of claim 10 wherein said spaced apart extents include downwardly extending lips for engagement with said pipe strap for supporting said pipe strap between said spaced apart extents.

12. A cable support tray of claim 11 wherein said cable support members are discrete and spaced apart defining spaces between each adjacent cable support member.

13. A cable support tray of claim 12 wherein one said cable support member includes said first cable support surface positioned in a first facing direction and an adjacent said cable support member includes said first cable support surface in a second facing direction opposite said first facing direction.

14. A cable support member of claim 11 wherein cable support members are spaced apart, and include a joining surface defined therebetween.

15. A cable support member of claim 14 wherein joining surface is ventilated.

16. A support tray for elongate cables comprising:
a pair of longitudinally extending, transversely spaced rails;
a plurality of longitudinally spaced, transversely extending cable support members extending between said spaced rails;
each said cable support member including a plurality of transversely spaced apertures for permitting passage of a cable tie therethrough and defining between adjacent apertures a first elongate cable support surface for directly supporting a longitudinal extent of one of said cables, said cable extent being securable against said cable support surface by said cable tie passage through said adjacent apertures; and
each said cable support member further including pipe strap accommodating means for supporting a pipe strap and defining thereadjacent a second elongate cable support surface longitudinally spaced from said first cable support surface for supporting an elongate extent of one of said cables.

17. A support tray of claim 16 wherein each said cable support member is a discrete element spaced from each adjacent cable support member.

18. A support tray of claim 17 wherein said first and second cable support surfaces are coplanar and longitudinally spaced.

19. A cable support tray of claim 18 wherein said cable support member includes a third surface positioned between said first and second surfaces, said third surface including said pipe strap supporting means.

20. A cable support tray of claim 19 wherein said third surface lies in a plane vertically spaced from the plane of said first and second surfaces.

21. A cable support tray of claim 17 wherein said first cable support surfaces define a surface area coverage of at least approximately 10% of said cable tray.

22. A cable support tray of claim 16 wherein each of said rails includes an inwardly directed longitudinal lower edge for supporting thereon said cable support member.

23. A cable support tray of claim 22 wherein each of said rails includes an outwardly extending longitudinal bead opposed to said lower edge.

24. A support tray of claim 16 wherein said first and second cable support surfaces are vertically spaced.

25. A support tray of claim 16 further including an elongate cable barrier extending longitudinally between said rails.

26. A support tray of claim 25 wherein said cable barrier is supported by said cable supporting means.

27. A support tray of claim 26 wherein said pipe strap accommodating means secures said cable barrier to said cable support member.

28. A support tray of claim 16 further including an elongate, generally planar surface extending between said rails, said planar surface including said cable support member spaced thereon.

29. A support tray of claim 28 wherein said planar surface includes a plurality of longitudinally spaced coplanar first planar portions defining said cable support members and a plurality of longitudinally spaced coplanar second planar portions between said first planar portions.

30. A support tray of claim 29 wherein said first planar portions lie in a plane vertically spaced from a plane containing said second planar portions.

31. A support tray of claim 30 wherein said second planar portion includes ventilation openings therethrough.

32. A support tray of claim 16 wherein said first and second cable support surfaces are coplanar and longitudinally spaced.

* * * * *